United States Patent
Bunda et al.

[11] Patent Number: 6,105,032
[45] Date of Patent: Aug. 15, 2000

[54] METHOD FOR IMPROVED BIT SCAN BY LOCATING A SET BIT WITHIN A NONZERO DATA ENTITY

[75] Inventors: John D Bunda; Arturo Martin-de-Nicolas, both of Austin, Tex.

[73] Assignee: IP-First, L.L.C., Fremont, Calif.

[21] Appl. No.: 09/092,386

[22] Filed: Jun. 5, 1998

[51] Int. Cl.$^7$ ................................................. G06F 17/00
[52] U.S. Cl. ............................ 707/101; 707/3; 348/473; 348/475
[58] Field of Search .............................. 345/442; 348/473, 348/475; 707/3, 4, 5, 6, 101, 102, 201, 206, 205

[56] References Cited

U.S. PATENT DOCUMENTS

| | | | |
|---|---|---|---|
| 4,611,272 | 9/1986 | Lomet | 707/3 |
| 5,134,688 | 7/1992 | Corthout | 345/442 |
| 5,461,426 | 10/1995 | Limberg et al. | 348/475 |
| 5,742,811 | 4/1998 | Agrawal et al. | 707/6 |

OTHER PUBLICATIONS

Rotenberg et al., Trace cache: a low latency approach to high bandwidth instruction fetching, MICRO–29 IEEE/ACM International Symposium, pp. 24–34, 1996.

Li, Minimum number of adders for implementing a multiplier and its application to the design of multiplierless digital filters, IEEE Transactions on Circuits and Systems, vol. 42 7, pp. 453–460, Jul. 1995.

Rotenberg et al., A trace cache microarchitecture and evaluation, IEEE Transactions on Computers, vol. 42, pp. 111–120, Feb. 1999.

Kornerup, Necessary and sufficient conditions for parallel, constant time conversion and addition, 14th IEE Symposium on Computer Arithmetic, pp. 152–156, 1996.

*Primary Examiner*—Thomas G. Black
*Assistant Examiner*—David Jung
*Attorney, Agent, or Firm*—Richard K. Huffman; James W. Huffman

[57] ABSTRACT

A method for improving the execution of significant bit scans on a data entity in a computer system is provided. The data entity is examined in a number of iterations equal to the base two logarithm of the size of the data entity in bits, N. Initially, half of the data entity is examined to determine if the significant bit is present. If not, the other half of the data entity is examined. The half within which the significant data entity resides is then iteratively halved and examined in each successive iteration of the method until the number of bits examined is equal to one.

21 Claims, 8 Drawing Sheets

Forward Bit Scan - Byte-Wide Method

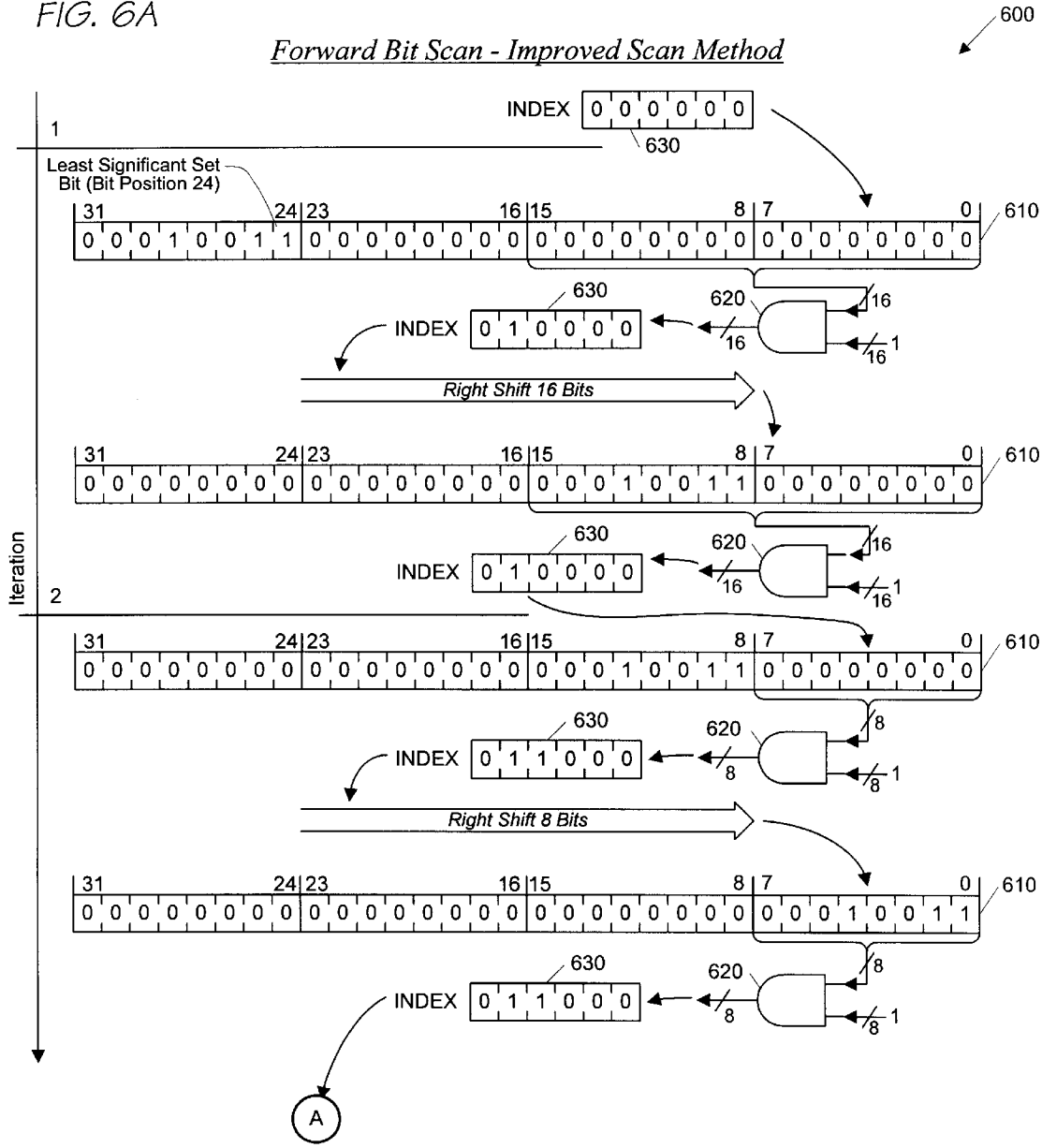

Forward Bit Scan - Improved Scan Method 6,105,032

METHOD FOR IMPROVED BIT SCAN BY LOCATING A SET BIT WITHIN A NONZERO DATA ENTITY

BACKGROUND OF THE INVENTION

1. Field of the Invention

This invention relates in general to the field of data processing in computers, and more particularly to a method for locating a significant set bit in a binary data entity.

2. Description of the Related Art

Present day computer systems operate on binary data entities. Instructions and associated data for the computer systems are encoded into binary formats ranging from standard formats to those formats which are entirely specific to a given software program.

In some formats, the combination of all of the bits in a given data entity may represent a piece of information, such as a character or a number. In other formats, each of the bits in a data entity may individually represent a piece of information. Furthermore, the position of a given bit within the data entity may reflect a priority or sequence of the given bit relative to the remaining bits in the data entity.

In view of the above, a common operation accomplished by a computer system is examining a data entity to locate a particular bit set to a specific logic state. Many computer instruction sets include instructions to test the state of specified bits within a data entity. Even more prevalent, though, are instructions whose function is to locate a most significant or a least significant logical one bit. The x86 instruction set has two such instructions: Bit Scan Forward (BSF) and Bit Scan Reverse (BSR). The BSF instruction directs a computer to locate the least significant logical one bit in a source data entity and provide an output operand containing its position within the source data entity. The BSR instruction directs a computer to locate the most significant logical one bit in a source data entity and provide an output operand containing its position within the source data entity.

The architecture for execution of the BSF and BSR instructions is fixed by the syntax of the instructions; however, the process by which a given computer system locates a significant bit and outputs its position is not predetermined. Some present day microprocessors employ a bit-wide scan method that tests each bit in order and increments/decrements an associated bit position index to reflect the position currently being tested. Other microprocessors have improved upon the bit-wide scan method by initially testing byte-wide samples of the data entity in order until a byte having a set bit is encountered. Once the byte having the set bit is found, then the method decreases the sample size to converge upon the specific location within the byte that contains the set bit. Like the bit-wide method, the byte-wide method adjusts an associated bit position index by amounts corresponding to the size of the test sample to reflect the approximate location of the significant set bit. For example, use of the bit-wide method to locate a least significant set bit in position 16 of a 32-bit data entity would require approximately 17 iterations. Use of the byte-wide method would require roughly six iterations.

The number of iterations required for these methods to complete on a given computer system are directly proportional to the associated execution time for the instructions. For this reason, a bit scan method that requires 1,000 iterations is judged by those skilled in the art as being much less desirable than another bit scan method that requires only ten iterations to complete.

While the byte-wide method indeed represents a considerable improvement over the bit-wide method, particularly in these times when 32-bit data entities are the norm, one skilled in the art will appreciate that both of the methods are inappropriate for use in searching data entities comprising many bits. This is because both methods exhibit linear growth in the number of required iterations to complete as data entity size increases. The number of iterations required for the bit-wide method to complete is proportional to the number of bits in the data entity. The number of iterations required for the byte-wide method to complete is proportional to the number of bytes in the data entity. More specifically, the bit-wide method would require 1,024 iterations to locate a least significant set bit in position 1,023 of a 1,024-bit data entity.

Historically, data entity sizes have grown, not linearly, but exponentially. And while advances in integrated circuit scaling technologies have enabled microprocessors to run at much greater speeds, much of the increase in speed has been relegated to execution of more complex logic circuits within a microprocessor. As a result, speed increases still cannot overcome the limitations imposed by linear scan methods.

Therefore, what is needed is a method for locating a significant set bit in a data entity that does not exhibit linear growth in the number of iterations to complete. In addition, what is needed is a bit scan method that exhibits only logarithmic growth in the number of iterations required to locate a significant set bit.

SUMMARY

To address the above-detailed deficiencies, it is an object of the present invention to provide a method for examining a data entity to detect a significant set bit that converges upon the location of the significant set bit in a number of iterations proportional to the base two logarithm of the size of the data entity.

Accordingly, in the attainment of the aforementioned object, it is a feature of the present invention to provide a method for locating a set bit within a nonzero data entity. The method includes providing the nonzero data entity, having a length of N bits, N being an integer power of two; and examining a first part of the nonzero data entity to detect any set bit. The first part is contiguous and has a length of N/2 bits. If a set bit is not detected in the first part, then the method proceeds by examining a second part of the nonzero data entity to detect any set bit. The second part is also contiguous and has a length of N/2 bits. Additionally, the second part does not overlap with the first part. The method also includes halving the number of contiguous bits to be examined within a remaining part. The remaining part is either the first part or the second part, corresponding to that part within which any set bit was detected in preceding examinations. The method also includes examining a first remaining part within the remaining part to detect any set bit. If the examination of the first remaining part does not detect any set bit, then the method proceeds by examining a second remaining part within the remaining part to detect any set bit. The second remaining part does not overlap with the first remaining part. The method also includes assigning either the first remaining part or the second remaining part to be the remaining part, corresponding to that remaining part within which any set bit was detected by prior examination, and halving the number of contiguous bits to be examined within the assigned remaining part. The method proceeds, until the number of bits examined is equal to one, by iteratively: examining first and second remaining parts of the remaining part; assigning the first or second remaining part to be the remaining part, and halving the number of contiguous bits to be examined within the assigned remaining part.

An advantage of the present invention is that the number of iterations required to locate a least significant set bit in a 1,024-bit data entity requires only 10 iterations to complete.

Another object of the present invention is to provide a method for examining a data entity to detect a significant set bit that does not exhibit linear increase in the number of iterations required to complete as data entity size increases.

In another aspect, it is a feature of the present invention to provide a method for generating a bit position index for a set bit within a nonzero data entity. The method includes providing the nonzero data entity, having a length of N bits, N being an integer power of two; setting the bit position index to zero; and examining a first part of the nonzero data entity to detect any set bit. The first part is contiguous and has a length of N/2 bits. If examination of the first part does not detect any set bit, then the method proceeds by examining a second part of the nonzero data entity to detect any set bit. The second part is contiguous and has a length of N/2 bits. Additionally, the second part does not overlap with the first part. The method also includes indicating, by the state of a most significant bit in the bit position index, the bit position index having a length of $\log_2 N$ bits, whether examination of the first part or the second part detected any set bit. The method also includes halving the number of contiguous bits to be examined within a remaining part. The remaining part is either the first part or the second part, corresponding to that part within which any set bit was detected by prior examination. The method also includes examining a first remaining part within the remaining part to detect any set bit. If examination of the first remaining part does not detect any set bit, the method proceeds by examining a second remaining part within the remaining part to detect any set bit. The second remaining part does not overlap with the first remaining part. The method also includes assigning a bit, one bit position lower than the most significant bit in the bit position index, to be a next lower bit; and indicating, by the state of the next lower bit in the bit position index, whether examination of the first remaining part or the second remaining part detected any set bit. The next lower bit is set if examination of the second remaining part detected any set bit in the second remaining part. The method also includes assigning either the first remaining part or the second remaining part to be the remaining part, corresponding to that remaining part within which any set bit was detected by either prior examination of the first remaining part or second remaining part, and halving the number of contiguous bits to be examined within the assigned remaining part. The method also includes assigning a bit, one position lower than the next lower bit, to be the next lower bit. The method iteratively repeats, until the number of bits examined is equal to one: examining the first and second remaining parts, assigning a next lower bit in the bit position index, indicating by the state of the next lower bit the corresponding location of the set bit within the first or second remaining part, assigning either the first remaining part or the second remaining part to be the remaining part, halving the number of contiguous bits to be examined within the assigned remaining part, and assigning a bit, one position lower than the next lower bit, to be the next lower bit.

In yet another aspect, it is a feature of the present invention to provide a method for indicating a least significant set bit in a nonzero data entity. The method includes, in a microprocessor, providing the nonzero data entity. The nonzero data entity has a length of N bits, N being an integer power of two. The method also includes setting a bit position index to zero; and examining a lower-order part of the nonzero data entity to detect any set bit, the lower-order part being contiguous and having a length of N/2 bits. If examination of the lower-order part does not detect any set bit, then the method proceeds by examining an upper-order part of the nonzero data entity to detect any set bit. The upper-order part is contiguous and has a length of N/2 bits. The upper-order part does not overlap with the lower-order part. The method also includes indicating, by the state of a most significant bit in the bit position index, the bit position index having a length of $\log_2 N$ bits, whether examination of the lower-order part or the upper-order part detected any set bit. The most significant bit is set if examination of the upper-order part detected any set bit in the upper-order part. The method also includes halving the number of contiguous bits to be examined within a remaining part, the remaining part being either the lower-order part or the upper-order part, corresponding to that part within which any set bit was detected by prior examination. The method also includes examining a lower-order remaining part within the remaining part to detect any set bit. If examination of the lower-order remaining part does not detect any set bit, then the method proceeds by examining an upper-order remaining part within the remaining part to detect any set bit. The upper-order remaining part does not overlap with the lower-order remaining part. The method also includes assigning a bit, one bit position lower than the most significant bit in the bit position index, to be a next lower bit; and indicating, by the state of the next lower bit in the bit position index, whether examination of the lower-order remaining part or upper-order remaining part detected any set bit. The next lower bit is set if examination of the upper-order remaining part detected any set bit. The method also includes assigning either the lower-order remaining part or the upper-order remaining part to be the remaining part, corresponding to that remaining part within which any set bit was detected by prior examination, and halving the number of contiguous bits to be examined within the assigned remaining part. The method also includes assigning a bit, one position lower than the next lower bit, to be the next lower bit. The method also includes iteratively repeating, until the number of bits examined is equal to one: examining lower-order and upper-order remaining parts within the remaining part; assigning a bit within the bit position index to be the next lower bit; indicating by the state of the next lower bit the results of prior examination; assigning either the lower-order remaining part or the upper-order remaining part to be the remaining part; halving the number of contiguous bits to be examined within the assigned remaining part; and assigning a bit, one position lower than the next lower bit, to be the next lower bit.

Another advantage of the present invention is that the methods provided can be used in computer systems having very large data entities without linearly increasing execution time.

BRIEF DESCRIPTION OF THE DRAWINGS

These and other objects, features, and advantages of the present invention will become better understood with regard to the following description, and accompanying drawings where.

DETAILED DESCRIPTION

In light of the above background on iterative methods for scanning a binary data entity, two specific related art examples will now be described with reference to FIGS. 1 through 3. These examples illustrate the problematic linear nature of present day methods for locating bits. Following this discussion, a detailed description of the present invention will be provided with reference to FIGS. 4 through 6. As data entity size increases, use of the present invention offers mere logarithmic growth in the number of iterations required to locate a set bit in a data entity as opposed to linear growth in the number of iterations exhibited by conventional methods.

Figure 1:
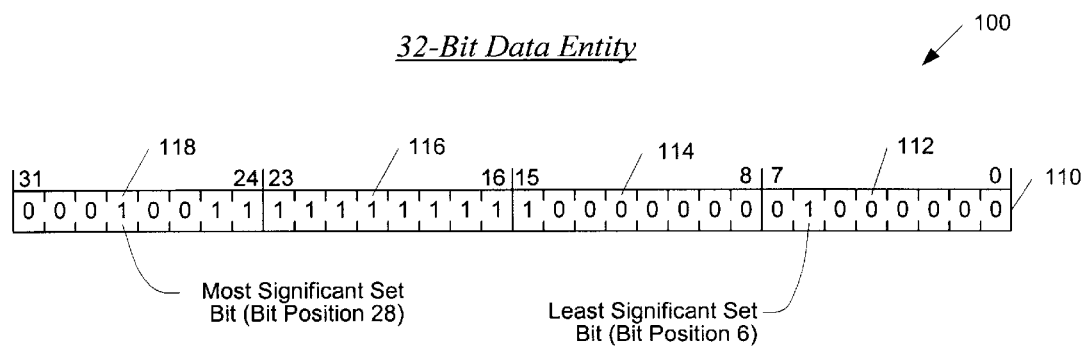
FIG. 1 is a block diagram of a 32-bit data entity illustrating locations of a most significant set bit and a least significant set bit.

Referring to FIG. 1, a block diagram of a 32-bit data entity 100 is presented illustrating locations of a most significant set bit and a least significant set bit. The 32-bit data entity 100 has 32 bit positions numbered from 0 through 31. Bits 0 through 7 form a first byte 112. A second byte 114 is composed of bits in bit positions 8 through 15. A third byte 116 is composed of bits in positions 16 through 23. A fourth byte 118 includes bits in bit positions 24 through 31. A lower-order half of the 32-bit data entity 100 is formed by the first and second bytes 112, 114. An upper-order half is formed by the third and fourth bytes 116, 118.

Each bit position in the 32-bit data entity 100 contains a binary bit whose state is denoted by a logical one, 1, or a logical zero, 0. It is customary to say that a bit is set when its state is logical one. In FIG. 1, a least significant set bit is in the lower-order half, in the first byte 112, in bit position 6. A most significant set bit is in the upper-order half, in the fourth byte 118, in bit position 28.

Data entities like that shown in FIG. 1 are commonly employed in today's computer systems. In some applications, the 32-bit data entity 100 in its entirety may represent a single event, a single character of the alphabet, or a single number. Yet, in many other applications, each individual bit position within the data entity 100 is assigned a unique meaning. For example, bit positions 0 through 31 may respectively represent the state of 32 identical circuits, each of which are interfaced to a given computer system in priority order. The circuit associated with bit position 0 is highest priority and the circuit associated with bit position 31 is lowest priority. A noteworthy circuit event is designated by a set bit in an associated bit position. Hence, according to this example, to detect a high priority circuit event requires that the given computer system locate a least significant set bit in the 32-bit data entity 100.

Locating a most significant or least significant set bit in a data entity is so common in software applications that present day microprocessors provide an instruction for doing so in their associated instruction set. In an x86-compatible microprocessor, there are two instructions of interest: BIT SCAN FORWARD (BSF) and BIT SCAN REVERSE (BSR). The BSF instruction locates the least significant set bit in source data entity, SRC. The BSR instruction locates the most significant set bit in SRC. Both instructions return a bit position index operand, DEST, containing the bit position within SRC, of the requested set bit. If the 32-bit data entity 100 of FIG. 1 were provided as the SRC operand for the BSF instruction, then BSF would return 0006H as the contents of the DEST operand. If the 32-bit data entity 100 were provided as the SRC operand for the BSR instruction, then BSR would return 001CH as the contents of the DEST operand.

Although an architecture is implied by the BSF and BSR instructions, x86-compatible microprocessors employ various methods to detect the set bit position within the SRC operand. Two of the most common methods are the bit-wide method and the byte-wide method. These are respectively presented in FIGS. 2 and 3.

Figure 2:
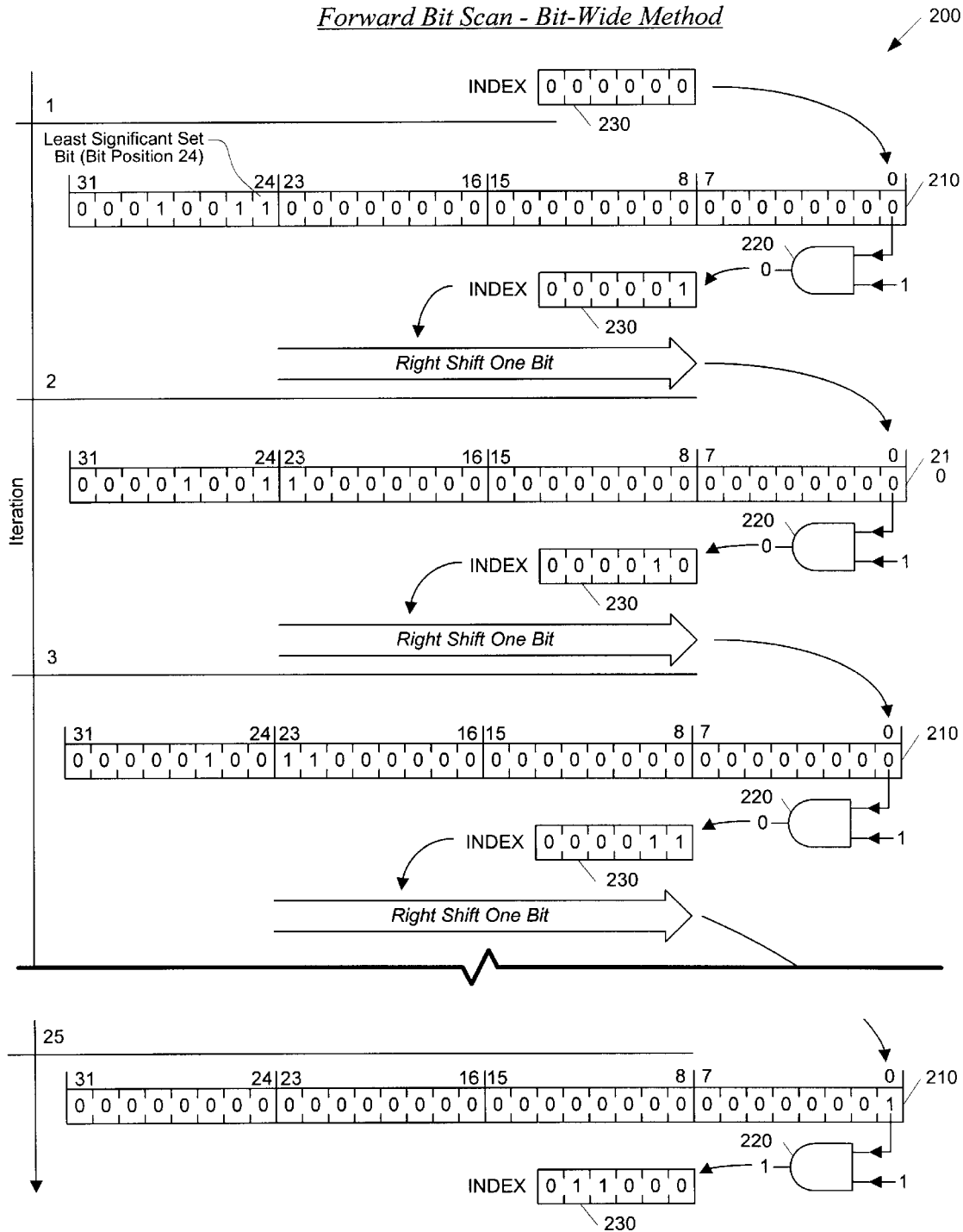
FIG. 2 is a flow diagram illustrating a related art bit-wide method for locating a least significant set bit in a 32-bit data entity.

Referring to FIG. 2, a flow diagram is presented illustrating a related art bit-wide method 200 for locating a least significant set bit in a 32-bit data entity 210. The method 200 includes testing the least significant bit in the 32-bit data entity 210, incrementing a bit position index 230, and right-shifting the data entity 210 by one bit position. A logical AND gate 220 represents the testing step of the method 200. Progression of the method 200 in a microprocessor is shown with respect to iteration number.

Prior to iteration 1, a BSF instruction is fetched from memory (not shown) referencing the data entity 210 as the SRC operand. Although not illustrated in FIG. 2, the data entity 210 is tested to determine if it is equal to zero, that is, if it does not have any set bit. If it is zero, then the microprocessor indicates by some means that the result of the scan is invalid. A common means is to set a zero flag in the microprocessor. If the data entity 210 is not zero, then the microprocessor initializes the bit position index 230 to indicate that the least significant set bit is in bit position 0. The data entity 210 of FIG. 2 is equal to 13000000H, the least significant set bit being in bit position 24. Progression proceeds to iteration 1 of the method 200.

During iteration 1, the bit in position 0 is logically ANDed with a logical one bit. If bit 0 were a logical one, then the output of the AND gate 220 would be a logical one. Since bit 0 is a logical zero, the output of the AND gate 220 is a 0, thus indicating that the least significant set bit is not bit 0. Consequently, the bit position index 230 is incremented to indicate that the least significant set bit is in bit position 1. In addition, the data entity 210 is right-shifted by one bit. Right-shifting the data entity 210 by one bit causes a logical zero to be inserted in bit position 31, bit 0 to be discarded, and all remaining bits to be shifted to the right by one bit position. Hence, the least significant bit is moved to from bit position 24 to bit position 23.

During iteration 2, the bit in position 0, which was in bit position 1 during iteration 1, is logically ANDed with a logical one bit. Since bit 0 is a logical zero, the output of the AND gate 220 is a 0, thus indicating that the least significant set bit is not the bit initially in position 1. Consequently, the bit position index 230 is incremented to indicate that the least significant set bit is in bit position 2. In addition, the data entity 210 is right-shifted by one bit. Hence, the least significant bit is moved to bit position 22.

During iteration 3, the bit in bit position 0, which was in bit position 2 during iteration 1, is logically ANDed with a logical one bit. Since bit 0 is a logical zero, the output of the AND gate 220 is a 0, thus indicating that the least significant set bit is not the bit initially in bit position 2. Consequently, the bit position index 230 is incremented to indicate that the least significant set bit is in bit position 3. In addition, the data entity 210 is right-shifted by one bit. Hence, the least significant bit is moved to bit position 21. Progression of the method 200 continues to linearly test each bit position in the data entity 210 in ascending order until the least significant set bit is right-shifted into bit 0 during iteration 24 (not shown) and the bit position index 230 is incremented to indicated that the least significant set bit is in bit position 24 (also not shown).

During iteration 25, the bit in bit position 0, which was in bit position 24 during iteration 1, is logically ANDed with a logical one bit. Since bit 0 is a logical one, the output of the AND gate 220 is a logical one, thus indicating that the least significant set bit is bit 24. At this point, the method 200 completes and the BSF instruction returns the bit position index 230 as the DEST operand.

The bit-wide method 200 is a linear method 200. That is, the method 200 requires a number of iterations, proportional to the number of bits in the data entity 210, to locate a set bit. If the least significant set bit were in bit 0, then the method 200 would require only one iteration. If the least significant set bit were in bit 31, then the method 200 would require 32 iterations. Assuming that it is equally probable for the least significant set bit to be in any of the bit positions of a particular 32-bit data entity, then the bit-wide method 200 would average 16 iterations to complete. Increasing the size of the data entity 210 to 64 bits would correspondingly increase the number of iterations to 32. Execution of the BSF instruction on a 256-bit data entity according to the bit-wide method 200 would average 128 iterations to complete. One skilled in the art will appreciate that the linear nature of the bit-wide method 200 is sub-optimum, even for microprocessors employing 32-bit data words.

Figure 3A:
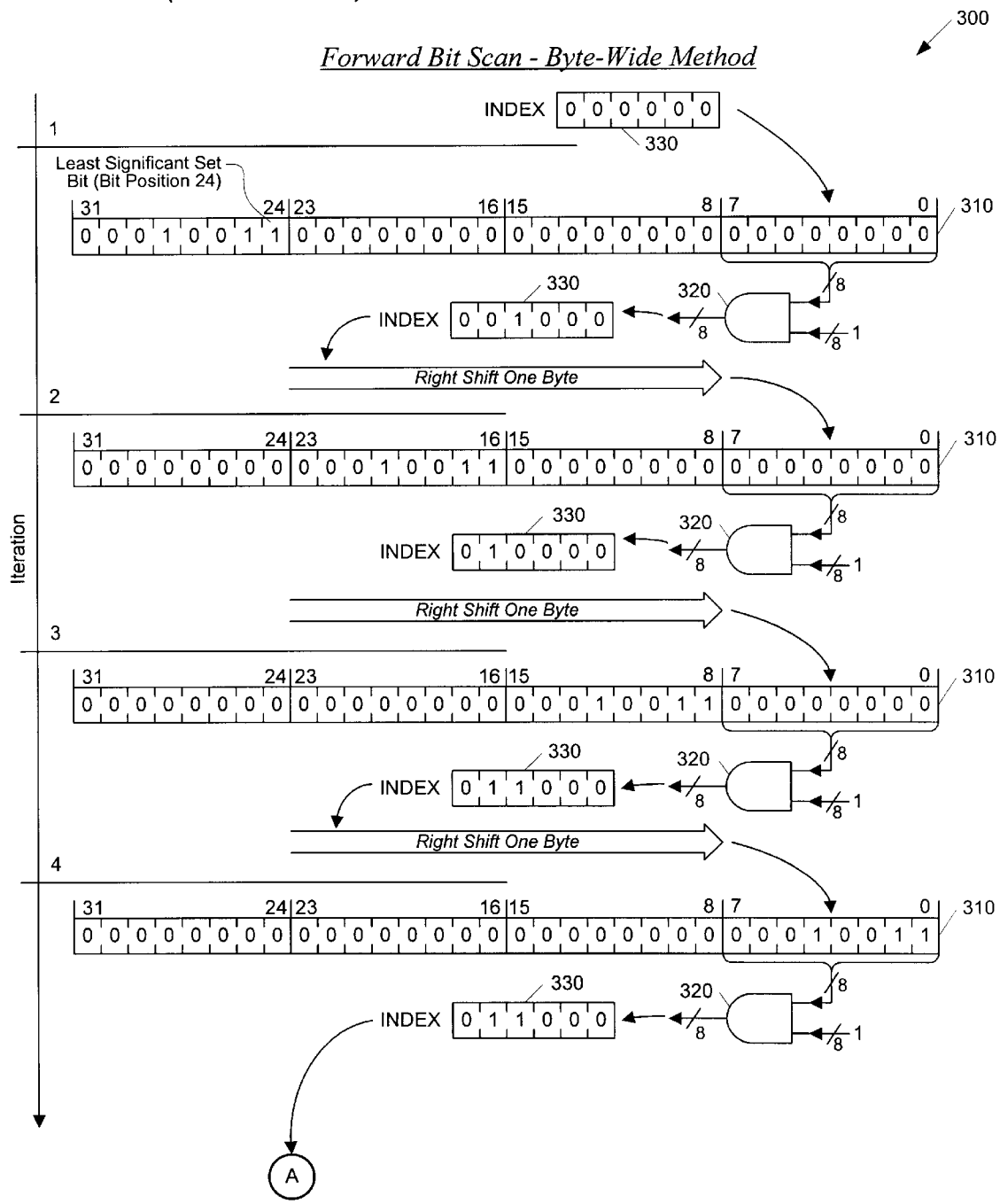
FIG. 3 is a flow diagram illustrating a related art byte-wide method for locating a least significant set bit in a 32-bit data entity.
Figure 3B:
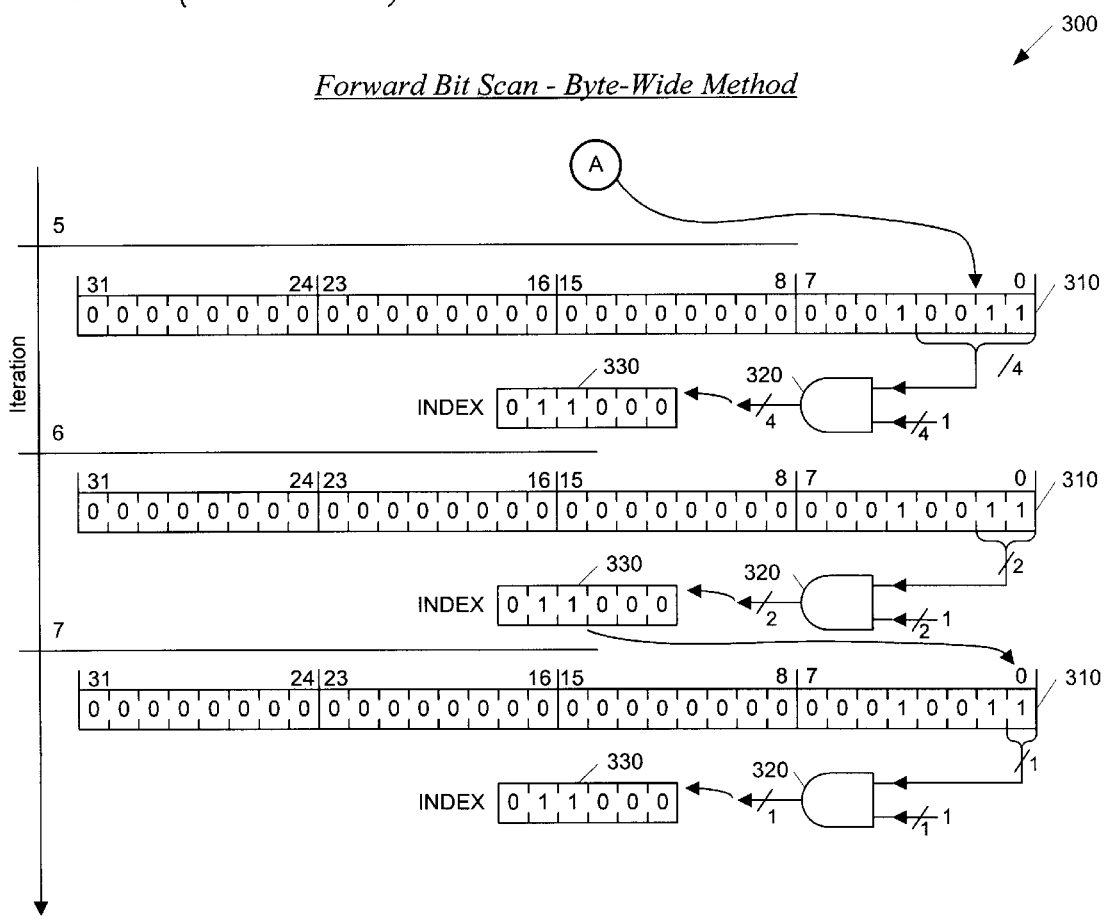

Now referring to FIG. 3, a flow diagram is presented illustrating a related art byte-wide method 300 for locating a least significant set bit in a 32-bit data entity 310. The byte-wide method 300 offers some improvement over the bit-wide method 200. The byte-wide method 300 includes testing the least significant byte in the 32-bit data entity 310, incrementing a bit position index 330 by eight, and right-shifting the data entity 310 by one byte. When a byte is found that is not equal to zero, then subsequent tests are performed on samples of the data entity in decreasing sizes until the size tested is one bit. A logical AND gate 320 that accepts operands up to one byte represents the testing step of the method 300. Progression of the method 300 in a microprocessor is shown with respect to iteration number.

Prior to iteration 1, a BSF instruction is fetched from memory (not shown) referencing the data entity 310 as the SRC operand. Like the method 200 of FIG. 2, the data entity 310 is initially tested to determine if it is equal to zero. If it is zero, then the microprocessor indicates that the result of the scan is invalid. If the data entity 310 is not zero, then the microprocessor initializes the bit position index 330 to indicate that the least significant set bit is in a low-order byte comprising bit positions 0–7. The data entity 310, like that of FIG. 2, is equal to 13000000H, the least significant set bit being in bit position 24. Progression proceeds to iteration 1 of the method 300.

During iteration 1, the low-order byte in bit positions 0–7 is logically ANDed with a byte comprising all logical one bits. If any bit in the low-order byte is set to a logical one, then the output of the AND gate 320 would not be equal to zero. Since the low-order byte is a logical zero, the output of the AND gate 320 is a logical zero, thus indicating that the least significant set bit is not in the low-order byte. Consequently, the bit position index 330 is incremented by eight to indicate that the least significant set bit is in a next higher byte comprising bit positions 8–15. In addition, the data entity 310 is right-shifted by one byte. Right-shifting the data entity 310 by one byte causes logical zeros to be inserted in the high-order byte comprising bit positions 24 through 31. Right-shifting also causes the low-order byte comprising bit positions 0–7 to be discarded, and all remaining bits to be shifted to the right by one byte. Hence, the least significant bit is moved from bit position 24 to bit position 16.

During iteration 2, the byte in bit positions 0–7, which was in bit positions 8–15 during iteration 1, is logically ANDed with a byte comprising all logical ones. Since bits 0–7 are all logical zeros, the output of the AND gate 320 is logical zero, thus indicating that the least significant set bit is not in bit positions 8–15. Consequently, the bit position index 330 is incremented by eight to indicate that the least significant set bit is in bit positions 16–23. In addition, the data entity 310 is right-shifted by one byte. Hence, the least significant bit is moved to bit position 8.

During iteration 3, the byte in bit positions 0–7, which was in bit positions 16–23 during iteration 1, is logically ANDed with a byte comprising all logical ones. Since bits 0–7 are all logical zeros, the output of the AND gate 320 is logical zero, thus indicating that the least significant set bit is not in bit positions 16–23. Consequently, the bit position index 330 is incremented by eight to indicate that the least significant set bit is in bit positions 24–31. In addition, the data entity 310 is right-shifted by one byte. Hence, the least significant bit is moved to bit position 0.

During iteration 4, the byte in bit positions 0–7, which was in bit positions 24–31 during iteration 1, is logically ANDed with a byte comprising all logical ones. Since bits 0–7 are not all logical zeros, the output of the AND gate 320 is not equal to logical zero, thus indicating that the least significant set bit is in bit positions 24–31. Consequently, the bit position index 330 indicates the correct byte within which the least significant bit resides. At this point the method 300 decreases the number of bits to be tested to four.

During iteration 5, the nibble in bit positions 0–3, which was in bit positions 24–27 during iteration 1, is logically ANDed with a nibble comprising all logical ones. Since bits 0–3 are not all logical zeros, the output of the AND gate 320 is not equal to logical zero, thus indicating that the least significant set bit is in bit positions 24–27. Consequently, the bit position index 330 indicates the correct nibble within which the least significant bit resides. If the least significant bit were not found in the nibble tested, then the method 300 would right-shift the data entity 310 by one nibble. At this point the method 300 decreases the number of bits to be tested to two.

During iteration 6, the half-nibble in bit positions 0–1, which was in bit positions 24–25 during iteration 1, is logically ANDed with a half-nibble comprising all logical ones. Since bits 0–1 are not all logical zeros, the output of the AND gate 320 is not equal to logical zero, thus indicating that the least significant set bit is in bit positions 24–25. Consequently, the bit position index 330 indicates the correct half-nibble within which the least significant bit resides. If the least significant bit were not found in the half-nibble tested, then the method 300 would right-shift the data entity 310 by one half-nibble. At this point the method 300 decreases the number of bits to be tested to one.

During iteration 7, the bit in bit position 0, which was in bit position 24 during iteration 1, is logically ANDed with a logical one bit. Since bit 0 is a logical one, the output of the AND gate 320 is not equal to logical zero, thus indicating that the least significant set bit is in bit position 24. Consequently, the bit position index 330 indicates the correct bit within which the least significant bit resides. If the least significant bit were not found in the bit position tested, then the method 300 would right-shift the data entity 310 by one bit. At this point, the method 300 completes and the BSF instruction returns the bit position index 330 as the DEST operand.

The byte-wide method 300 is also a linear method 300. Although it exhibits notable improvement over the bit-wide method 200, it still requires a number of iterations proportional to the number of bits in the data entity 310 to locate a set bit. If the least significant set bit were in bit 0, then the method 200 would require only four iterations. If the least significant set bit were in bit 31, then the method 200 would require 10 iterations. Assuming that it is equally probable for the least significant set bit to be in any of the bit positions of a particular 32-bit data entity, then the bit-wide method 200 would average 7 iterations to complete. Increasing the size of the data entity 210 to 64 bits would correspondingly increase the number of iterations to roughly 14. Execution of the BSE instruction on a 256-bit data entity according to the bit-wide method 200 would average about 56 iterations to complete.

Although the byte-wide method 300 for locating a set bit offers some improvement over the bit-wide method 200, both methods 200, 300 are limited in their applicability to computer systems having relatively small data entity sizes. Although both methods 200, 300 have been described in terms of the number of iterations to complete, one skilled in the art will appreciate that, in a computer system, numbers of iterations for a method to complete directly correspond to execution time. And it is a basic objective of a computer system designer to minimize execution time. Add to this the fact that, historically, data entity size has grown exponentially rather than linearly. Early microprocessors employed 8-bit data entities. In less than 20 years, internal data busses are now approaching 128 bits in size. The expectation is that this trend will continue. Hence, as data entity size continues to increase, corresponding linear growth in the number of iterations to executed a bit scan is a significant problem. Programs that incorporate numerous bit scan instructions will be unnecessarily bottlenecked when those instructions are based upon linear detection methods.

The present invention overcomes the linear nature of conventional bit scan methods by providing scan methods that exhibit only logarithmic growth in required iterations. A description of the present invention is provided with reference to FIGS. 4 through 6 below.

Figure 4:
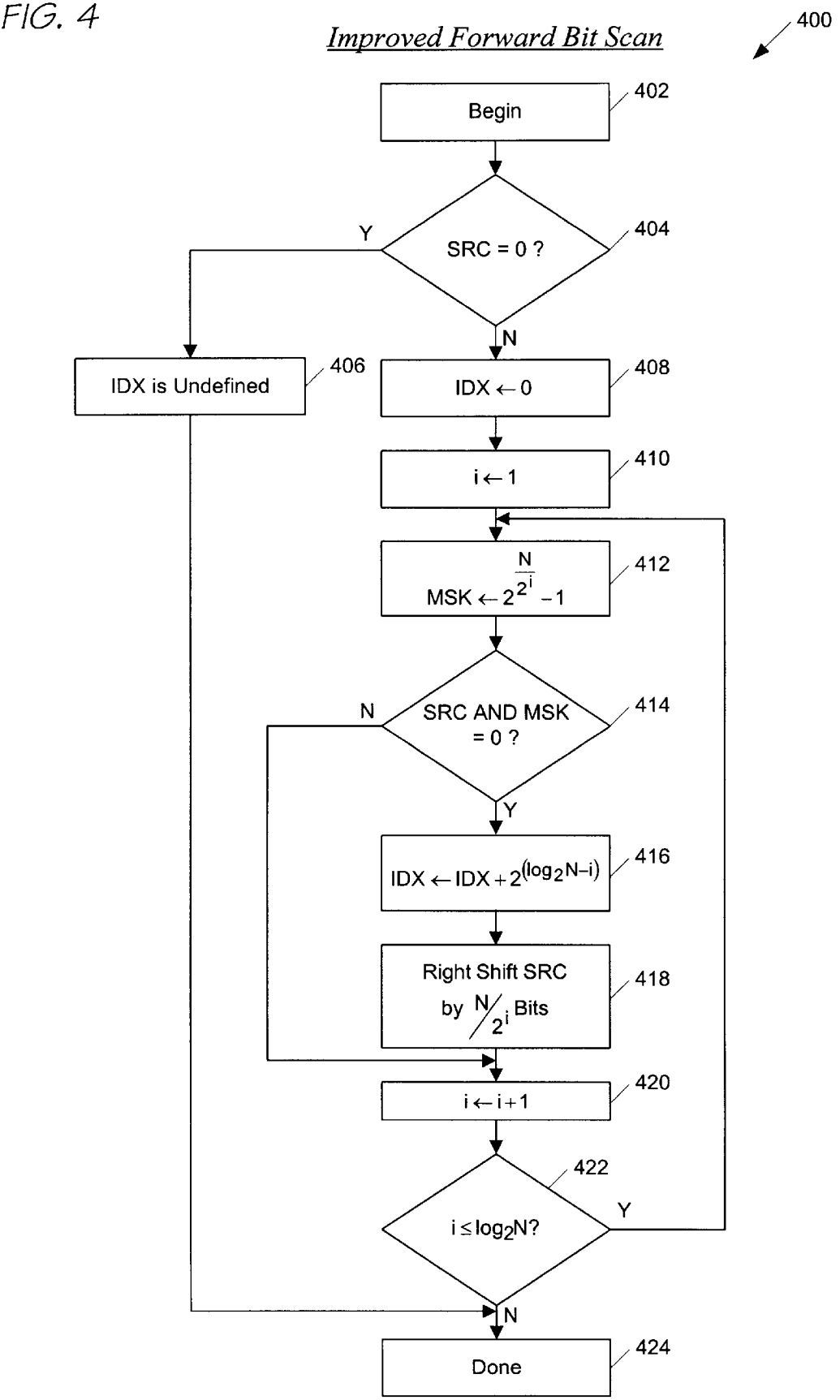
FIG. 4 is a flow chart depicting the method according to the present invention for locating a least significant set bit in a data entity.

Now referring to FIG. 4, a flow chart 400 is provided depicting the method according to the present invention for locating a least significant set bit in a data entity. As described earlier, a task to locate the least significant bit is initiated in an x86-compatible microprocessor, by executing a BSF instruction. The method described with reference to FIG. 4 applies to a data entity, N bits in length, where N is a power of two. In summary, the method involves examining the data entity by halves to detect any set bit, indicating by the state of a most significant bit in a bit position index in which half of the data entity the least significant bit resides, and iteratively decreasing the number of bits examined by powers of two to finally converge upon the least significant bit. Each successively next lower bit in the bit position index corresponds in indication to the size of the sample examined during a given iteration.

The method begins a block 402 wherein the BSF instruction references a data entity, SRC, for examination. Flow then proceeds to decision block 404.

At decision block 404, the data entity, SRC, is evaluated to determine whether it is equal to zero. If it is equal to zero, then flow proceeds to block 406. If it is not equal to zero, then flow proceeds to block 408.

At block 406, the method indicates that the result of the BSF operation is undefined because the data entity, SRC, does not have any set bits. Hence, a bit position index, IDX, is undefined. Various means may be employed to indicate the undefined result of the BSF operation. Flow then proceeds to block 424.

At block 408, the bit position index, IDX is initially set to zero, thus indicating that the least significant set bit is in bit position 0. Flow then proceeds to block 410.

At block 410, an iteration counter, i, is set to one. Flow then proceeds to block 412.

At block 412, a mask, MSK, is generated that is N bits in length. The mask contains logical ones in a first part, or low-order part, and logical zeros in a second part, or high-order part. During the first iteration, i being equal to one, the upper half of the mask, MSK, is zeros, and the lower half, is ones. As the iteration counter, i, is incremented, the number of ones in the mask decreases by powers of two, with the ones always being in the low-order bits. Flow then proceeds to decision block 414.

At decision block 414, the data entity, SRC, is logically ANDed with the mask generated in block 412. The result of the AND operation is evaluated to determine whether the result is zero. Thus, ANDing with the mask sets the upper bits of the data entity, SRC, to all zeros, and the lower bits are tested via the AND operation to detect any set bit. A result of zero indicates that no set bits are present in the tested part of the data entity. Initially, when the iteration counter, i, is equal to one, the upper N/2 bits are set to zero and the lower N/2 bits of the data entity are examined to see if they contain any set bit. As i is incremented, the number of bits examined decreases in accordance with the value of MSK, until only one bit is examined. During any iteration, if the result of the examination is equal to zero, thus indicating that no set bit is present in the examined sample of the data entity, SRC, then flow proceeds to block 416. If the result of the examination is not equal to zero, thus indicating that a set bit is present in the examined sample, then flow proceeds to block 420.

At block 416, a bit in the bit position index, IDX, corresponding to the number of bits of the data entity that were examined in block 414, is set to a logical one. For example, if N is 32, and if the lower 16 bits of the data entity did not contain the least significant set bit, then the bit in bit position 5 of the bit position index, IDX, would be set to logical one, thus indicating that the least significant set bit is present in the upper 16 bits of the 32-bit data entity. Note that if the least significant set bit is within a lower part examined in block 414, then this block 416 is not executed. As a result, the bit in the bit position index would remain at zero. Flow then proceeds to block 418.

At block 418, since the result of the examination in block 414 did not find the least significant set bit in the examined part of the data entity, SRC, then the data entity is shifted to the right by the number of bits in the examination sample. During the first iteration, when i is equal to one, the lower half of the data entity is examined. By entering this block 418, it is known that the least significant set bit is not in the lower half of the data entity. Hence, the bits in the upper half of the data entity are shifted into the bit positions previously occupied by the lower half of the data entity. Flow then proceeds to block 420.

At block 420, the bit in the bit position index, IDX, corresponding to the number of bits examined in block 414, has been either set by block 416 or left at zero, thus properly indicating within which part of the data entity the least significant set bit resides. In this block 420, the iteration counter, i, is incremented by one. Flow then proceeds to decision block 422.

At decision block 422, the iteration counter, i, is evaluated. If i is greater than the base two logarithm of N, then flow proceeds to block 424. If i is less than or equal to the base two logarithm of N, then flow is directed to block 412, wherein a new iteration of the method begins. When i is equal to $\log_2 N$, the examination sample size is one bit and the state of the least significant bit of the bit position index, IDX, is set to indicate whether the least significant set bit of the data entity, SRC, is in an odd or an even bit position.

At block 424, the method completes by providing the bit position index, IDX, as a result. The bit position index, IDX, correctly indicates the position of the least significant set bit in the data entity, SRC. One skilled in the art will appreciate that iteration growth, when employing a forward bit scan according to the present invention, is logarithmic, rather than linear. Hence, to locate the least significant set bit in a 32-bit data entity only requires five iterations. Six iterations are required for a 64-bit data entity. Location of the least significant bit in a 1,024-bit data entity requires 10 iterations to complete.

Figure 5:
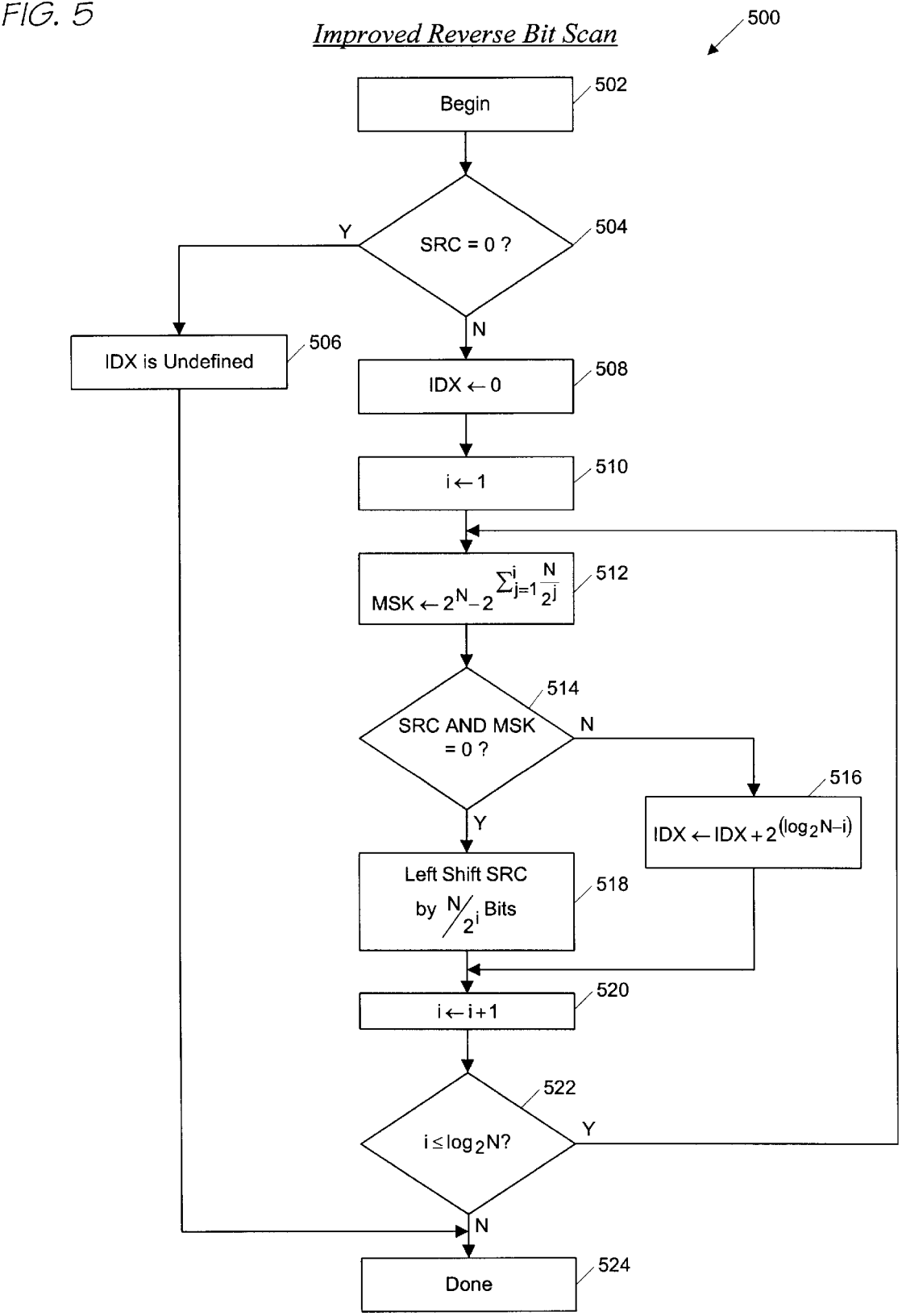
FIG. 5 is a flow chart depicting the method according to the present invention for locating a most significant set bit in a binary data entity.

Now referring to FIG. 5, a flow chart 500 is provided depicting the method according to the present invention for locating a most significant set bit in a data entity. A task to locate the most significant bit is initiated in an x86-compatible microprocessor, by executing a BSR instruction. The method described with reference to FIG. 5 applies to a data entity, N bits in length, where N is a power of two. In summary, the method involves examining the data entity by halves to detect any set bit, indicating by the state a most significant bit in a bit position index in which half of the data entity the most significant bit resides, and iteratively decreasing the number of bits examined by powers of two to finally converge upon the most significant bit. Each successively next lower bit in the bit position index corresponds in indication to the size of the sample examined during a given iteration.

The method begins a block 502 wherein the BSR instruction references a data entity, SRC, for examination. Flow then proceeds to decision block 504.

At decision block 504, the data entity, SRC, is evaluated to determine whether it is equal to zero. If it is equal to zero, then flow proceeds to block 506. If it is not equal to zero, then flow proceeds to block 508.

At block 506, the method indicates that the result of the BSR operation is undefined because the data entity, SRC, does not have any set bits. Hence, a bit position index, IDX, is undefined. As before, various means may be employed to indicate the undefined result of the BSR operation. Flow then proceeds to block 524.

At block 508, the bit position index, IDX is initially set to zero, thus indicating that the most significant set bit is in bit position 0. Flow then proceeds to block 510.

At block 510, an iteration counter, i, is set to one. Flow then proceeds to block 512.

At block 412, a mask, MSK, is generated that is N bits in length. The mask contains logical ones in a first part, or upper-order part, and logical zeros in a second part, or lower-order part. During the first iteration, i being equal to one, the lower half of the mask, MSK, is zeros, and the upper half, is ones. As the iteration counter, i, is incremented, the number of ones in the mask decreases by powers of two, with the ones always being in the high-order bits. For example, for a 32-bit data entity, N is equal to 32. During the third iteration of the method, i being equal to 3, MSK is computed in this block 512 to equal F0000000H, corresponding to an examination sample size of four bits. Following generation of the mask, MSK, flow then proceeds to decision block 514.

At decision block 514, the data entity, SRC, is logically ANDed with the mask generated in block 512. The result of the AND operation is evaluated to determine whether the result is zero. Thus, ANDing with the mask sets the lower corresponding bits of the data entity, SRC, to all zeros, and the upper bits are tested via the AND operation to detect any set bit. A result of zero indicates that no set bits are present in the tested part of the data entity. Initially, when the iteration counter, i, is equal to one, the lower N/2 bits are set to zero and the upper N/2 bits of the data entity are examined to see if they contain any set bit. As i is incremented, the number of bits examined decreases in accordance with the value of MSK, until only one bit is examined. During any iteration, if the result of the examination is equal to zero, thus indicating that no set bit is present in the examined sample of the data entity, SRC, then flow proceeds to block 518. If the result of the examination is not equal to zero, thus indicating that a set bit is present in the examined sample, then flow proceeds to block 516.

At block 516, a bit in the bit position index, IDX, corresponding to the number of bits of the data entity that were examined in block 514, is set to a logical one. For example, if N is 32, and if the upper 16 bits of the data entity contain the most significant set bit, then the bit in bit position 5 of the bit position index, IDX, would be set to logical one, thus indicating that the most significant set bit is present in the upper 16 bits of the 32-bit data entity. Note that if the most significant set bit is not within an upper part examined in block 514, then this block 516 is not executed. As a result, the bit in the bit position index would remain at zero. Flow then proceeds to block 520.

At block 518, since the result of the examination in block 514 did not find the most significant set bit in the examined part of the data entity, SRC, then the data entity is shifted to the left by the number of bits in the examination sample. During the first iteration, when i is equal to one, the upper half of the data entity is examined. By entering this block 518, it is known that the most significant set bit is not in the upper half of the data entity. Hence, the bits in the lower half of the data entity are shifted into the bit positions previously occupied by the upper half of the data entity. Flow then proceeds to block 520.

At block 520, the bit in the bit position index, IDX, corresponding to the number of bits examined in block 514, has been either set by block 516 or left at zero, thus properly indicating within which part of the data entity the most significant set bit resides. In this block 520, the iteration counter, i, is incremented by one. Flow then proceeds to decision block 522.

At decision block 522, the iteration counter, i, is evaluated. If i is greater than the base two logarithm of N, then flow proceeds to block 524. If i is less than or equal to the base two logarithm of N, then flow is directed to block 512, wherein a new iteration of the method begins. When i is equal to log₂N, the examination sample size is one bit and the state of the least significant bit of the bit position index, IDX, is set to indicate whether the most significant set bit of the data entity, SRC, is in an odd or an even bit position.

At block 524, the method completes by providing the bit position index, IDX, as a result. The bit position index, IDX, correctly indicates the position of the most significant set bit in the data entity, SRC. One skilled in the art will appreciate that iteration growth, when employing a reverse bit scan according to the present invention, is logarithmic, rather than linear. Hence, to locate the most significant set bit in a 32-bit data entity only requires five iterations. Six iterations are required for a 64-bit data entity. Location of the most significant bit in a 1,024-bit data entity requires only 10 iterations to complete.

Figure 6B:
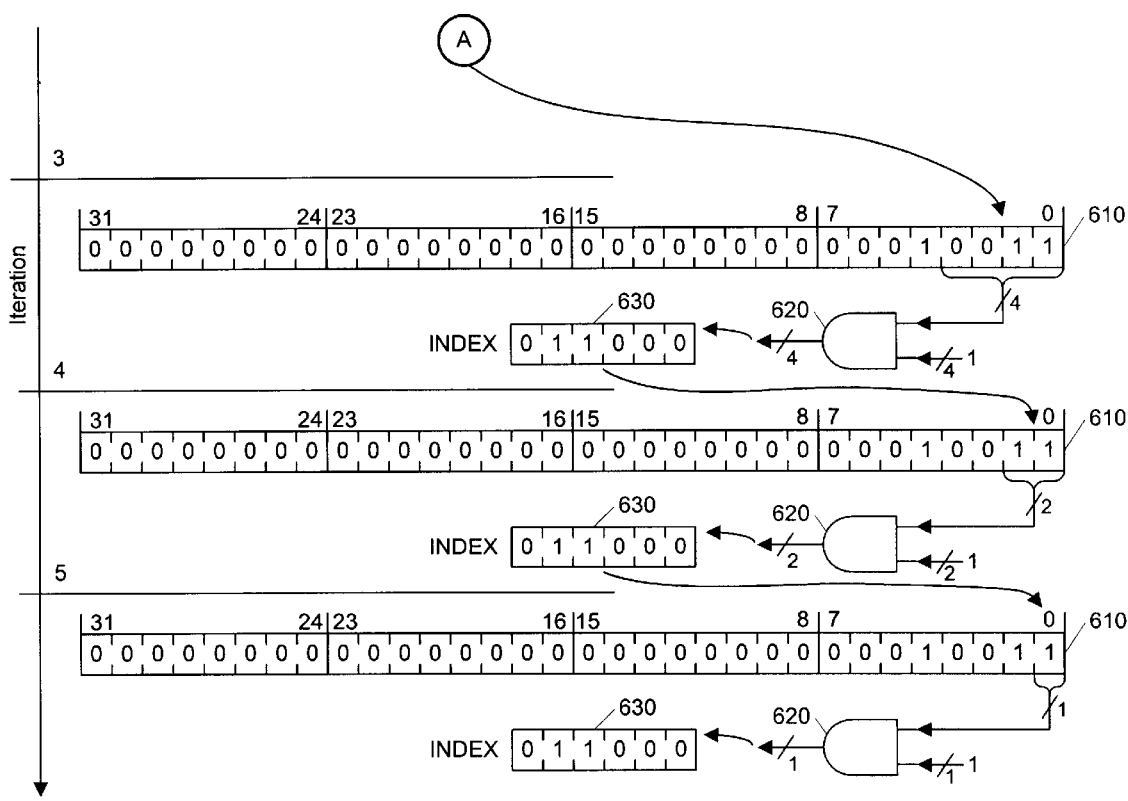
FIG. 6 is a flow diagram illustrating the method according to the present invention for locating a least significant set bit in a 32-bit data entity.

Now referring to FIG. 6, a flow diagram 600 is presented illustrating the method according to the present invention 600 for locating a least significant set bit in a 32-bit data entity 610. The least significant set bit is in bit position 24, the same position as the least significant set bit described with reference to FIGS. 2 and 3. Even with a 32-bit data entity 610, the method according to the present invention provides an improvement over the conventional linear methods 200, 300. The method according to the present invention 600 includes testing the lower-order 16 bits in the 32-bit data entity 610, indicating by the state of a most significant corresponding bit in a bit position index 630 whether the least significant set bit is in the upper half or the lower half of the data entity 610, and right-shifting the data entity 300 by 16 bits if the least significant set bit is not in the lower-order half. Following this initial iteration, subsequent tests are performed on samples of the data entity in decreasing sizes until the size tested is one bit. A logical AND gate 620 that accepts operands up to 16 bits represents the testing step of the method 600. Progression of the method 600 in a microprocessor is shown with respect to iteration number.

Prior to iteration 1, a BSF instruction is fetched from memory (not shown) referencing the data entity 610 as the SRC operand. The data entity 610 is initially tested to determine if it is equal to zero. If it is zero, then the microprocessor indicates that the result of the scan is invalid. If the data entity 610 is not zero, then the microprocessor initializes the bit position index 630 to indicate that the least significant set bit is in a lower-order half of the data entity 610 comprising bit positions 0–15. Progression proceeds to iteration 1 of the method 600.

During iteration 1, the low-order half in bit positions 0–15 is logically ANDed with 16 logical one bits. If any bit in the lower-order 16 bits of the data entity 610 is set to a logical one, then the output of the AND gate 620 would not be equal to zero. Since the lower-order 16 bits of the data entity 610 are logical zeros, the output of the AND gate 620 is a logical zero, thus indicating that the least significant set bit is not in the lower-order half of the data entity 610. Consequently, the bit position index 630 is incremented by 16 to indicate that the least significant set bit is in an upper-order half of the data entity 610 comprising bit positions 16–31. In addition, the data entity 610 is right-shifted by 16 bits. Right-shifting the data entity 610 by 16 bits causes logical zeros to be inserted in the upper-order half comprising bit positions 16 through 31. Right-shifting also causes all remaining bits to be shifted to the right by 16 bits. Hence, the least significant bit is moved from bit position 24 to bit position 8.

Also during iteration 1, the 16 bits in bit positions 0–15, which were in bit positions 16–31, are logically ANDed with 16 logical ones. Since bits 0–15 are not all logical zeros, the output of the AND gate 620 is not logical zero, thus indicating that the least significant set bit is in the examined bit positions, those initially in bit positions 16–31. Consequently, the bit position index 630 correctly indicates that the least significant set bit is in bit positions 16–31 of the original data entity 610.

During iteration 2, the examination sample size is cut by half and the eight bits in bit positions 0–7, which were in bit positions 16–23 during iteration 1, are logically ANDed with eight logical ones. Since bits 0–7 are all logical zeros, the output of the AND gate 620 is logical zero, thus indicating that the least significant set bit is not in the examined bit positions, those initially in bit positions 16–23. Consequently, the bit position index 630 is incremented by eight to indicate that the least significant set bit is in bit positions 24–31 of the original data entity 610.

Also during iteration 2, the eight bits in bit positions 0–7, which were in bit positions 24–31 during iteration 1, are logically ANDed with eight logical ones. Since bits 0–7 are not all logical zeros, the output of the AND gate 620 is not logical zero, thus indicating that the least significant set bit is in the examined bit positions, those initially in bit positions 24–31. Consequently, the bit position index 630 correctly indicates that the least significant set bit is in bit positions 24–31 of the original data entity 610.

During iteration 3, the examination sample size is cut by half and the four bits in bit positions 0–3, which were in bit positions 24–27 during iteration 1, are logically ANDed with four logical ones. Since bits 0–3 are not all logical zeros, the output of the AND gate 620 is not logical zero, thus indicating that the least significant set bit is in the examined bit positions, those initially in bit positions 24–27. Consequently, the bit position index 630 correctly indicates that the least significant set bit is in bit positions 24–27 of the original data entity 610.

During iteration 4, the examination sample size is cut by half and the two bits in bit positions 0–1, which were in bit positions 24–25 during iteration 1, are logically ANDed with two logical ones. Since bits 0–1 are not all logical zeros, the output of the AND gate 620 is not logical zero, thus indicating that the least significant set bit is in the examined bit positions, those initially in bit positions 24–25. Consequently, the bit position index 630 correctly indicates that the least significant set bit is in bit positions 24–25 of the original data entity 610.

During iteration 5, the final iteration, the examination sample size is cut by half and the bit in bit position 0, which was in bit position 24 during iteration 1, is logically ANDed with a logical one. Since bit 0 is a logical one, the output of the AND gate 620 is a logical one, thus indicating that the least significant set bit is in the examined bit position, the bit initially in bit position 24–25. Consequently, the bit position index 630 correctly indicates that the least significant set bit is in bit positions 24 of the original data entity 610.

Use of the present invention for a 32-bit data entity requires only five iterations to locate the least significant set bit. More substantial savings in required iterations are exhibited as the size of the data entity is increased.

Although the present invention and its objects, features, and advantages have been described in detail, other embodiments are encompassed by the invention. For example, the present invention has been particularly described in terms of a set bit being a logical one. However, it is entirely within the scope of the present invention to address searches for a set bit, wherein the bit it set when it is equal to a logical zero.

In addition, the present invention has been characterized primarily with regard to locating a significant set bit in a microprocessor or computer system. It is inconsequential, however, by what host platform the search is carried out. Rather, the method can be performed upon any platform capable of the manipulation of binary data to include, signal processors, embedded controllers, industrial controllers, and programmed logic devices.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A method for locating a set bit within a nonzero data entity, the method comprising:

a) providing the nonzero data entity, having a length of N bits, N being an integer power of two;

b) examining a first part of the nonzero data entity to detect any set bit, the first part being contiguous and having a length of N/2 bits;

c) if b) does not detect any set bit, examining a second part of the nonzero data entity to detect any set bit, the second part being contiguous and having a length of N/2 bits, the second part not overlapping with the first part;

d) halving the number of contiguous bits to be examined within a remaining part, the remaining part being either the first part or the second part, corresponding to that part within which any set bit was detected by either b) or c);

e) examining a first remaining part within the remaining part to detect any set bit;

f) if e) does not detect any set bit, examining a second remaining part within the remaining part to detect any set bit, the second remaining part not overlapping with the first remaining part;

g) assigning either the first remaining part or the second remaining part to be the remaining part, corresponding to that remaining part within which any set bit was detected by either e) or f), and halving the number of contiguous bits to be examined within the assigned remaining part;

h) iteratively repeating e) through g) until the number of bits examined is equal to one.

2. The method for locating as recited in claim 1, wherein a set bit is a bit set to a logical one state.

3. The method for locating as recited in claim 1, wherein a) provides the nonzero data entity in a microprocessor.

4. The method for locating as recited in claim 3, wherein b) comprises:

masking off the second part of the nonzero data entity; and
   logically ANDing the first part with a mask, N/2 bits in length, having all of its bits set.

5. The method for locating as recited in claim 4, wherein said masking off results in all of the bits within the second part being set to logical zero.

6. The method for locating as recited in claim 4, wherein, if there are no set bits in the first part of the nonzero data entity, then said logically ANDing produces a result having all of its bits being equal to logical zero.

7. The method for locating as recited in claim 3, wherein c) comprises:

shifting the second part by N/2 bit positions so that the second part occupies the bit positions previously occupied by the first part.

8. The method for locating as recited in claim 1, wherein d) and g) results in an series designating the number of bits to be examined in successive iterations, the series being of the form $$\frac{N}{2^1}, \frac{N}{2^2}, \ldots, \frac{N}{2^{(\log_2 N - 1)}}, \frac{N}{2^{\log_2 N}}.$$

9. The method for locating as recited in claim 1, wherein, if the set bit is a least significant set bit, b) comprises:

examining the low-order N/2 bits of the nonzero data entity.

10. The method for locating as recited in claim 9, wherein, if the set bit is a least significant set bit, c) comprises:

shifting the high-order N/2 bits into the bit positions previously occupied by the low-order N/2 bits.

11. The method for locating as recited in claim 1, wherein, if the set bit is a most significant set bit, b) comprises:

examining the high-order N/2 bits of the nonzero data entity.

12. The method for locating as recited in claim 11, wherein, if the set bit is a most significant set bit, c) comprises:

shifting the low-order N/2 bits into the bit positions previously occupied by the high-order N/2 bits.

13. A method for generating a bit position index for a set bit within a nonzero data entity, the method comprising:

a) providing the nonzero data entity, having a length of N bits, N being an integer power of two;

b) setting the bit position index to zero;

c) examining a first part of the nonzero data entity to detect any set bit, the first part being contiguous and having a length of N/2 bits;

d) if c) does not detect any set bit, examining a second part of the nonzero data entity to detect any set bit, the second part being contiguous and having a length of N/2 bits, the second part not overlapping with the first part;

e) indicating, by the state of a most significant bit in the bit position index, the bit position index having a length of $\log_2 N$ bits, whether c) or d) detected any set bit in the first part or the second part of the nonzero data entity;

f) halving the number of contiguous bits to be examined within a remaining part, the remaining part being either the first part or the second part, corresponding to that part within which any set bit was detected by either c) or d);

g) examining a first remaining part within the remaining part to detect any set bit;

h) if g) does not detect any set bit, examining a second remaining part within the remaining part to detect any set bit, the second remaining part not overlapping with the first remaining part;

i) assigning a bit, one bit position lower than the most significant bit in the bit position index, to be a next lower bit;

j) indicating, by the state of the next lower bit in the bit position index, whether g) or h) detected any set bit within the first remaining part or the second remaining part of the nonzero data entity, the next lower bit being set if h) detected any set bit in the second remaining part;

k) assigning either the first remaining part or the second remaining part to be the remaining part, corresponding to that remaining part within which any set bit was detected by either g) or h), and halving the number of contiguous bits to be examined within the assigned remaining part;

k) assigning a bit, one position lower than the next lower bit, to be the next lower bit;

l) iteratively repeating g) through k) until the number of bits examined is equal to one.

14. The method for generating a bit position index as recited in claim 13, wherein a) provides the nonzero data entity in a microprocessor.

15. The method for generating a bit position index as recited in claim 14, wherein, if the set bit is a least significant set bit, c) comprises:

examining the lower-order N/2 bits of the nonzero data entity.

16. The method for generating a bit position index as recited in claim 14, wherein, if the set bit is a least significant set bit, d) comprises:

shifting the upper-order N/2 bits into the bit positions previously occupied by the lower-order N/2 bits.

17. The method for generating a bit position index as recited in claim 14, wherein, if the set bit is a least significant set bit, e) comprises:

setting the most significant bit, if d) detected any set bit in the second part.

18. The method for generating a bit position index as recited in claim 14, wherein, if the set bit is a most significant set bit, c) comprises:

examining the upper-order N/2 bits of the nonzero data entity.

19. The method for generating a bit position index as recited in claim 14, wherein, if the set bit is a most significant set bit, d) comprises:

shifting the lower-order N/2 bits into the bit positions previously occupied by the upper-order N/2 bits.

20. The method for generating a bit position index as recited in claim 14, wherein, if the set bit is a most significant set bit, e) comprises:

setting the most significant bit, if c) detected any set bit in the first part.

21. A method for indicating a least significant set bit in a nonzero data entity, the method comprising:

a) in a microprocessor, providing the nonzero data entity, having a length of N bits, N being an integer power of two;

b) setting a bit position index to zero;

c) examining a lower-order part of the nonzero data entity to detect any set bit, the lower-order part being contiguous and having a length of N/2 bits;

d) if c) does not detect any set bit, examining an upper-order part of the nonzero data entity to detect any set bit, the upper-order part being contiguous and having a length of N/2 bits, the an upper-order part not overlapping with the lower-order part;

e) indicating, by the state of a most significant bit in the bit position index, the bit position index having a length of $\log_2 N$ bits, whether c) or d) detected any set bit in the lower-order part or the upper-order part of the nonzero data entity, the most significant bit being set if d) detected any set bit in the upper-order part;

f) halving the number of contiguous bits to be examined within a remaining part, the remaining part being either the lower-order part or the upper-order part, corresponding to that part within which any set bit was detected by either c) or d);

g) examining a lower-order remaining part within the remaining part to detect any set bit;

h) if g) does not detect any set bit, examining an upper-order remaining part within the remaining part to detect any set bit, the upper-order remaining part not overlapping with the lower-order remaining part;

i) assigning a bit, one bit position lower than the most significant bit in the bit position index, to be a next lower bit;

j) indicating, by the state of the next lower bit in the bit position index, whether g) or h) detected any set bit within the lower-order remaining part or the upper-order remaining part of the nonzero data entity, the next lower bit being set if h) detected any set bit in the upper-order remaining part;

k) assigning either the lower-order remaining part or the upper-order remaining part to be the remaining part, corresponding to that remaining part within which any set bit was detected by either g) or h), and halving the number of contiguous bits to be examined within the assigned remaining part;

k) assigning a bit, one position lower than the next lower bit, to be the next lower bit;

l) iteratively repeating g) through k) until the number of bits examined is equal to one.

* * * * *